(12) United States Patent
DeHoff et al.

(10) Patent No.: US 12,603,562 B2

(45) Date of Patent: Apr. 14, 2026

(54) TWO-SPEED MAGNETIC GEARBOX WITH AXIALLY OFFSET MODULATORS

(71) Applicant: Schaeffler Technologies AG & Co. KG, Herzogenaurach (DE)

(72) Inventors: Kyle DeHoff, Canal Fulton, OH (US); Nicholas Hrusch, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 291 days.

(21) Appl. No.: 18/222,150

(22) Filed: Jul. 14, 2023

(65) Prior Publication Data

US 2025/0023438 A1     Jan. 16, 2025

(51) Int. Cl.
H02K 49/10          (2006.01)

(52) U.S. Cl.
CPC ................................. H02K 49/102 (2013.01)

(58) Field of Classification Search
CPC ...... H02K 49/102; H02K 49/10; H02K 16/02; H02K 1/2783; H02K 1/2792
USPC ................................................ 310/103, 104
See application file for complete search history.

(56) References Cited

U.S. PATENT DOCUMENTS

| | | | |
|---|---|---|---|
| 9,013,081 B2 | 4/2015 | Atallah et al. | |
| 2011/0215668 A1* | 9/2011 | Peng | H02K 49/102 |
| | | | 310/106 |

| | | | |
|---|---|---|---|
| 2012/0120516 A1* | 5/2012 | Harrell | H02K 1/2783 |
| | | | 359/896 |
| 2016/0156257 A1* | 6/2016 | Atkins | H02K 49/102 |
| | | | 310/74 |
| 2018/0278139 A1* | 9/2018 | Kimoto | H02K 49/106 |
| 2020/0091809 A1* | 3/2020 | Bird | H02K 49/102 |

OTHER PUBLICATIONS

Author: Jian, Linni; Chau, K. T. Source: Design and Analysis of an Integrated Halbach-magnetic-geared Permanent-magnet Motor for Electric Vehicles; Journal of Asian Electric Vehicles, vol. &, No. 1. Department of Electrical and Electronic Engineering, The University of Hong Kong; Jun. 2009.
Author: Tallerico, Thomas F., et al. Source: Design of a Magnetic Gear for NASA's Vertical Lift NASA Glenn Research Center, Cleveland, Ohio.

* cited by examiner

*Primary Examiner* — Michael Andrews

(57)                    ABSTRACT

A two-speed magnetic gearbox includes a magnetic ring with first magnets distributed about an inner circumference forming first pole pairs, a magnetic sun including second magnets distributed about an outer circumference forming second plurality pole pairs, a first modulator arranged radially between the magnetic ring and the magnetic sun and a second modulator arranged coaxial with and axially offset from the first modulator. The first modulator is axially displaceable and includes a first plurality of electric steel laminations, and the second modulator is axially displaceable to a position radially between the magnetic ring and the magnetic sun and includes a second plurality of electric steel laminations. A quantity of second pole pairs is different than a quantity of first pole pairs and a quantity of the first plurality of electric steel laminations is different than a quantity of the second plurality of electric steel laminations.

18 Claims, 5 Drawing Sheets

TWO-SPEED MAGNETIC GEARBOX WITH AXIALLY OFFSET MODULATORS

TECHNICAL FIELD

The present disclosure relates generally to a magnetic gearbox, and more specifically to a two-speed magnetic gearbox.

BACKGROUND

Magnetic gears are known. One example is shown and described in U.S. Pat. No. 9,013,081 titled VARIABLE MAGNETIC GEARS to Atallah et al., hereby incorporated by reference as if set forth fully herein.

SUMMARY

Example aspects broadly comprise a two-speed magnetic gearbox including a magnetic ring with an inner circumference and a first plurality of magnets distributed about the inner circumference forming a first plurality of pole pairs, a magnetic sun arranged radially inside of the magnetic ring, the magnetic sun including an outer circumference and a second plurality of magnets distributed about the outer circumference forming a second plurality of pole pairs, a first modulator arranged radially between the magnetic ring and the magnetic sun and a second modulator arranged coaxial with and axially offset from the first modulator. The first modulator is axially displaceable and includes a first plurality of electric steel laminations, and the second modulator is axially displaceable to a position radially between the magnetic ring and the magnetic sun and includes a second plurality of electric steel laminations. A quantity of the second plurality of pole pairs is different than a quantity of the first plurality of pole pairs and a quantity of the first plurality of electric steel laminations is different than a quantity of the second plurality of electric steel laminations.

In some example embodiments, the first modulator and the second modulator each include a respective non-magnetic carrier, and the first plurality of electric steel laminations and the second plurality of electric steel laminations are circumferentially distributed in the respective non-magnetic carrier. In an example embodiment, the respective non-magnetic carriers are integrally formed from a same piece of material. In an example embodiment, the two-speed magnetic gearbox also includes a shifting shaft for axially displacing the respective non-magnetic carriers.

In an example embodiment, the first modulator and the second modulator are rotationally fixed such that they rotate at a same speed. In an example embodiment, the first plurality of magnets are arranged in a first Halbach array and the second plurality of magnets are arranged in a second Halbach array. In an example embodiment, the first plurality of magnets are arranged in groups rotated relative to each other in succession to form individual pole pairs, and the second plurality of magnets are arranged in groups rotated relative to each other in succession to form individual pole pairs. In an example embodiment, the first plurality of magnets are arranged in groups of exactly four magnets rotated ninety degrees to each other in succession to form individual pole pairs, and the second plurality of magnets are arranged in groups of exactly four magnets rotated ninety degrees to each other in succession to form individual pole pairs.

In some example embodiments, the first plurality of magnets forms a first plurality of pole pairs, the second plurality of magnets forms a second plurality of pole pairs, the quantity of the first plurality of electric steel laminations is equal to a sum of the quantity of the first plurality of pole pairs and the quantity of the second plurality of pole pairs, and the quantity of the second plurality of electric steel laminations is equal to a difference between the quantity of the first plurality of pole pairs and the quantity of the second plurality of pole pairs. In an example embodiment, the quantity of the first plurality of pole pairs is exactly six pole pairs and the quantity of the second plurality of pole pairs is exactly two pole pairs.

In some example embodiments, the two-speed magnetic gearbox also includes a first shaft rotationally fixed to the magnetic sun and a second shaft rotationally fixed to the first modulator and the second modulator. In an example embodiment, the two-speed magnetic gearbox also includes a bearing for radially positioning the second shaft relative to the first shaft. In some example embodiments, the two-speed magnetic gearbox also includes a carrier and a ball spline. The first plurality of electric steel laminations and the second plurality of electric steel laminations are circumferentially distributed and axially offset in the carrier, and the carrier is rotationally fixed and axially displaceable relative to the second shaft through the ball spline. In an example embodiment, the ball spline includes a ball spline sleeve rotationally fixed to the carrier and a plurality of balls arranged radially between the ball spline sleeve and the second shaft. In an example embodiment, the two-speed magnetic gearbox also includes a non-rotatable housing, and the magnetic ring is rotationally fixed to the non-rotatable housing.

Other example aspects broadly comprise a two-speed magnetic gearbox including a rotationally fixed magnetic ring having a first plurality of magnets arranged to form a first plurality of pole pairs, a rotatable magnetic sun having a second plurality of magnets arranged to form a second plurality of pole pairs, a first rotatable modulator having a first plurality of steel laminations, and a second rotatable modulator having a second plurality of steel laminations. A quantity of the first plurality of steel laminations is equal to a sum of a quantity of the first plurality of pole pairs and a quantity of the second plurality of pole pairs, and a quantity of the second plurality of steel laminations is equal to a difference of the quantity of the first plurality of pole pairs and the quantity of the second plurality of pole pairs. In some example embodiments, each one of the first plurality of pole pairs has exactly four magnets of the first plurality of magnets and each one of the second plurality of pole pairs has exactly four magnets of the second plurality of magnets.

In an example embodiment, each one of the first plurality of pole pairs is a Halbach array directed radially inward and each one of the second plurality of pole pairs is a Halbach array directed radially outward. In an example embodiment, the magnets of the first plurality of magnets forming each one of the first plurality of pole pairs are arranged in a Halbach array, and the magnets of the second plurality of magnets forming each one of the second plurality of pole pairs are arranged in a Halbach array.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
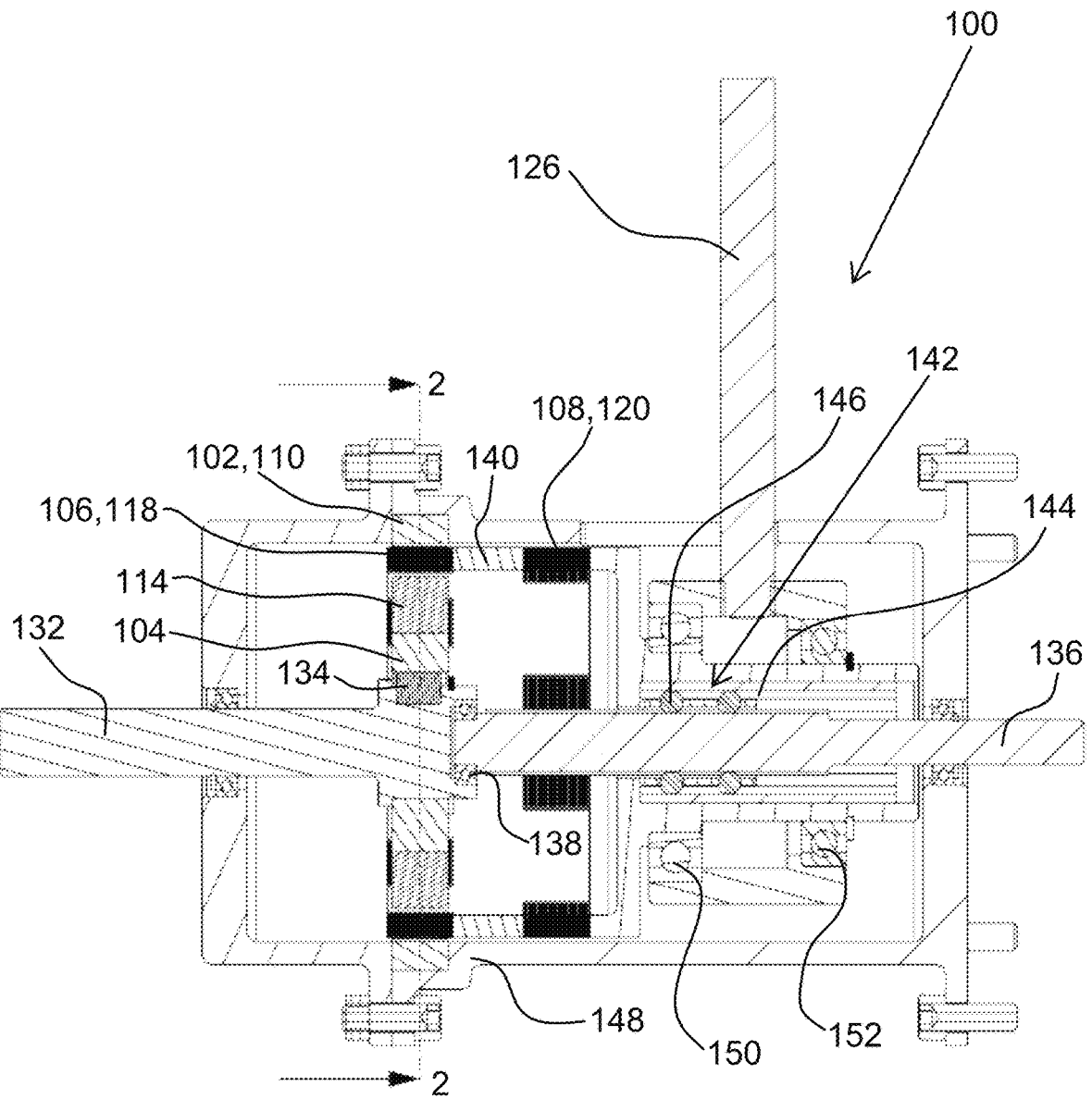
FIG. 1 illustrates a cross-sectional view of a two-speed magnetic gearbox shown in a first operating condition.
Figure 2:
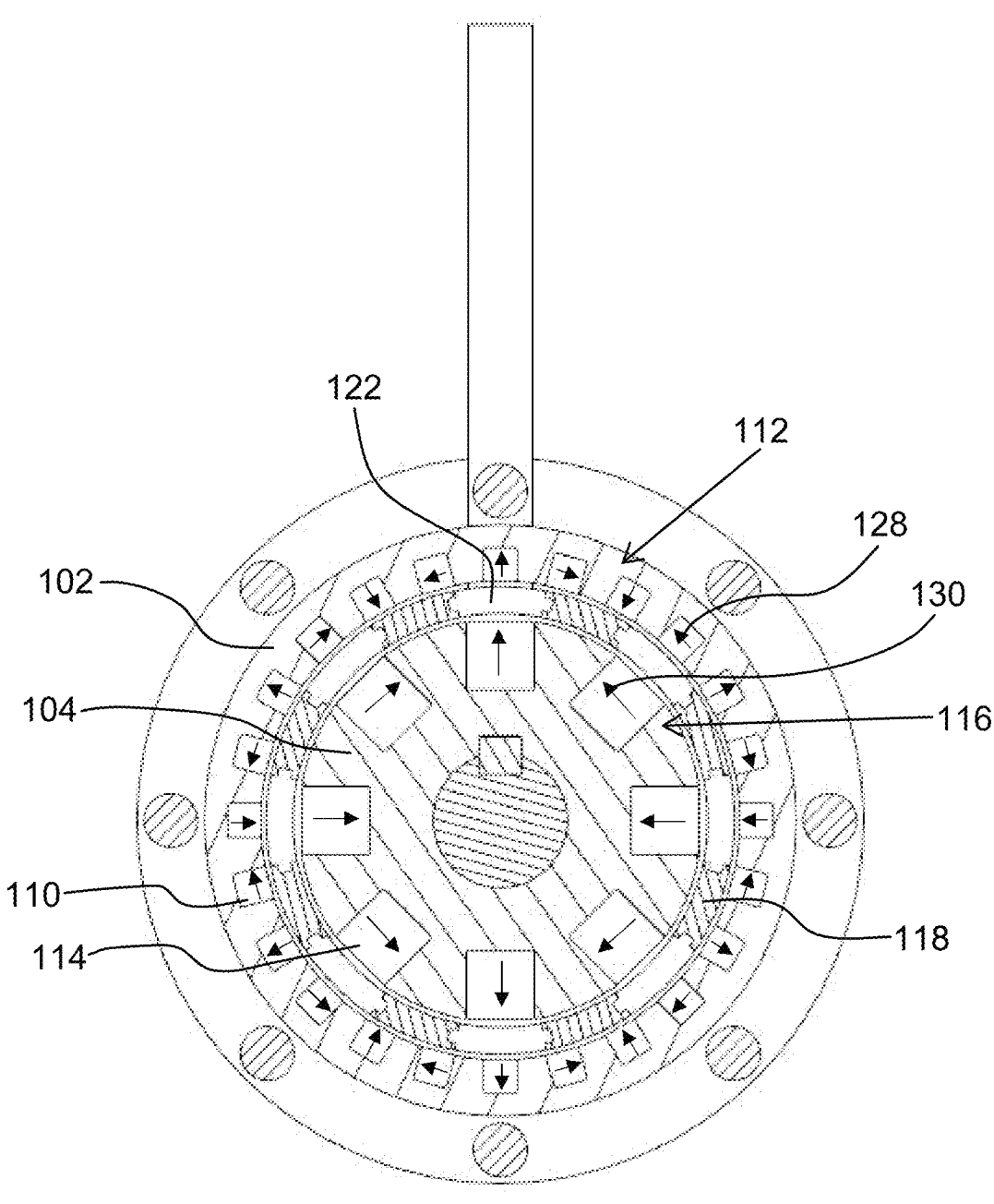
FIG. 2 illustrates a cross-sectional view of the two-speed magnetic gearbox of FIG. 1 taken generally along line 2-2 in FIG. 1.
Figure 3:
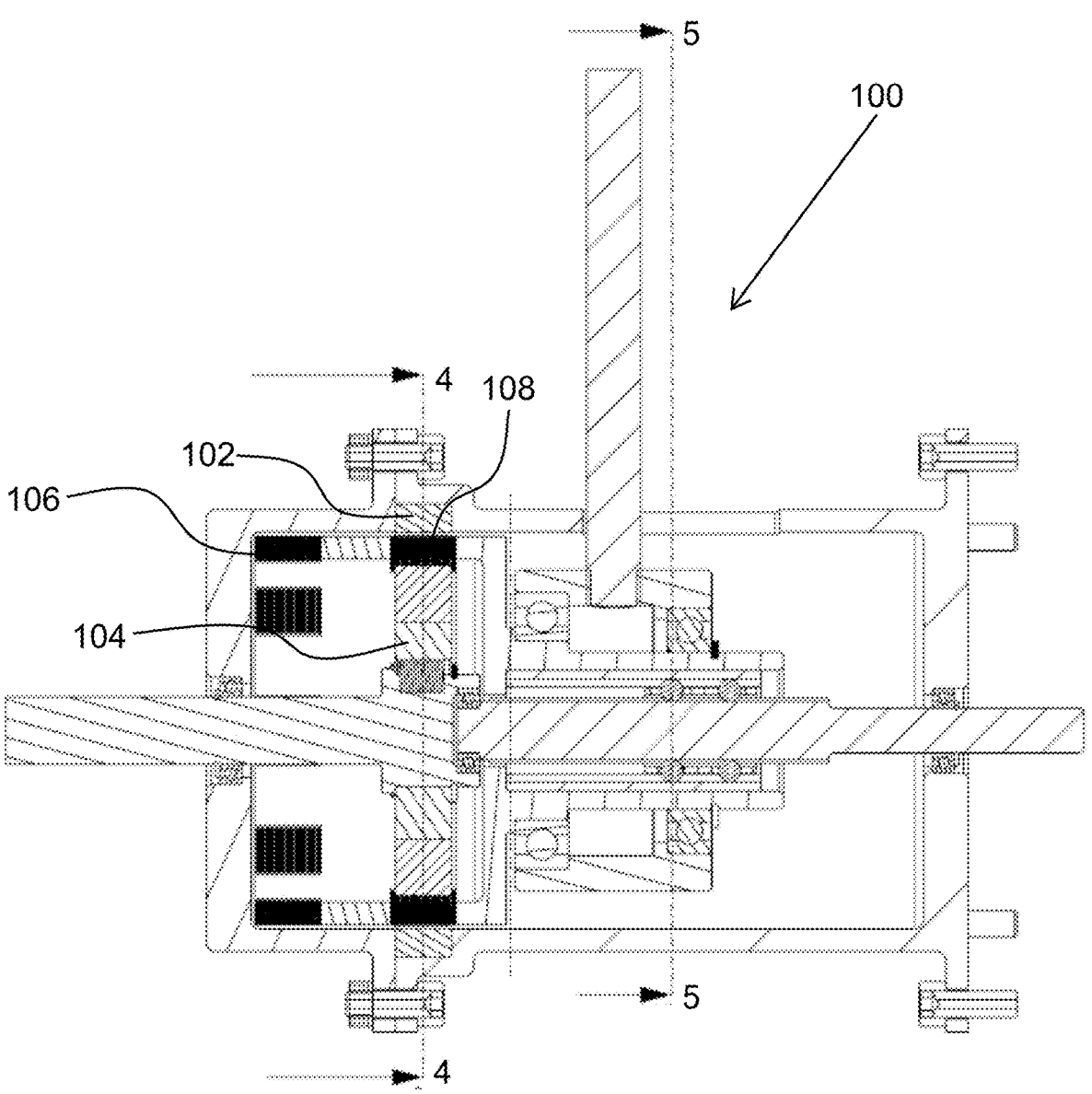
FIG. 3 illustrates a cross-sectional view of the two-speed magnetic gearbox of FIG. 1 shown in a second operating condition.
Figure 4:
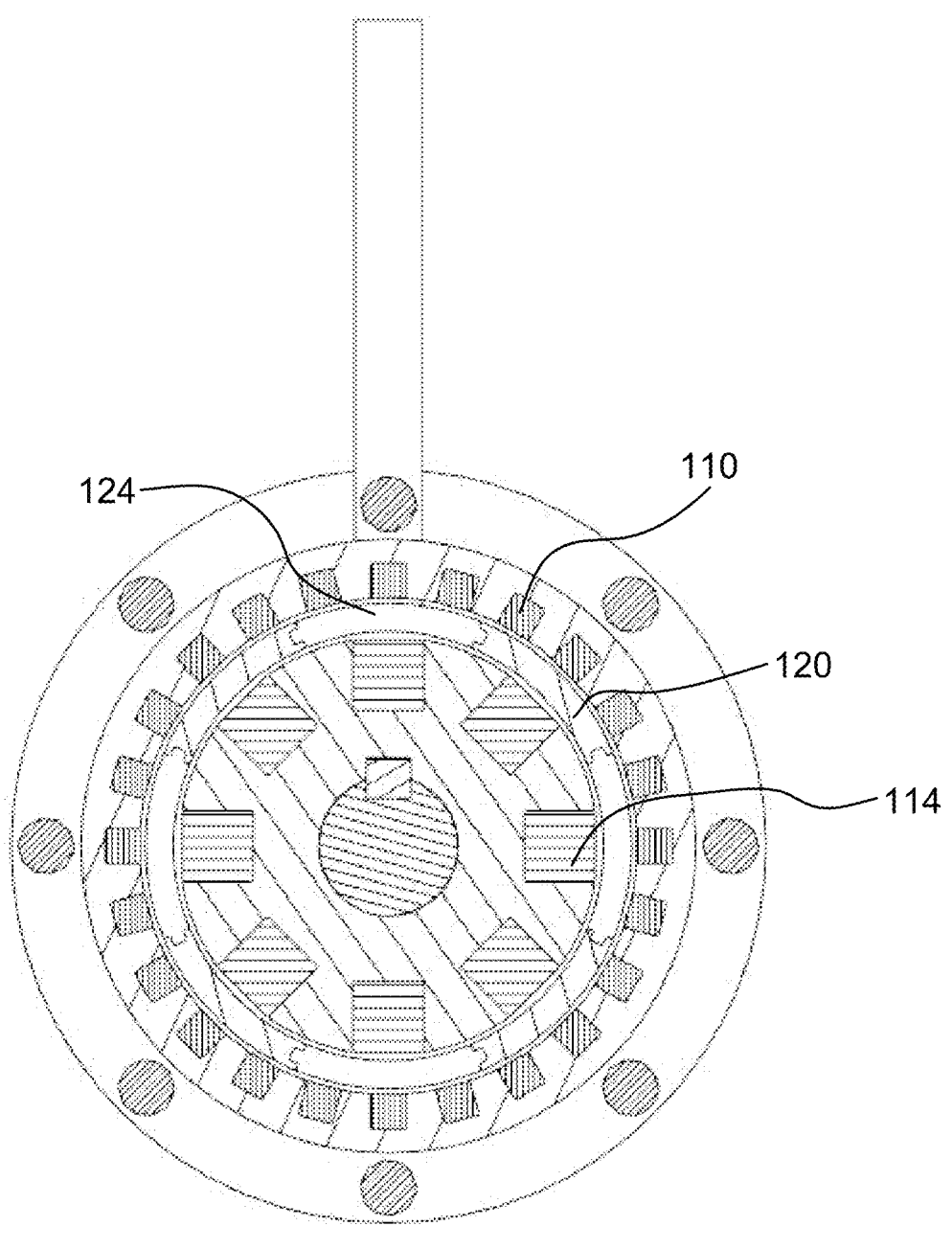
FIG. 4 illustrates a cross-sectional view of the two speed magnetic gearbox of FIG. 3 taken generally along line 4-4 in FIG. 3.

The following description is made with reference to FIGS. 1-4. FIG. 1 illustrates a cross-sectional view of a two-speed magnetic gearbox shown in a first operating condition. FIG. 2 illustrates a cross-sectional view of the two-speed magnetic gearbox of FIG. 1 taken generally along line 2-2 in FIG. 1. FIG. 3 illustrates a cross-sectional view of the two-speed magnetic gearbox of FIG. 1 shown in a second operating condition. FIG. 4 illustrates a cross-sectional view of the two speed magnetic gearbox of FIG. 3 taken generally along line 4-4 in FIG. 3.

Two-speed magnetic gearbox 100 includes magnetic ring 102, magnetic sun 104, modulator 106 arranged radially between the magnetic ring and the magnetic sun (as shown in FIG. 1, for example), and modulator 108 arranged coaxial with and axially offset from modulator 106. Magnetic ring 102 includes an inner circumference and magnets 110 distributed about the inner circumference forming pole pairs 112. Similarly, magnetic sun 104 includes an outer circumference and magnets 114 distributed about the outer circumference forming pole pairs 116. As shown in the figure, a quantity of pole pairs 116 is less than a quantity of pole pairs 112. Other configurations are possible, however. For example, other embodiments may include a quantity of pole pairs 116 is greater than a quantity of pole pairs 112. Modulator 106 is axially displaceable and includes electric steel laminations 118. Similarly, modulator 108 is axially displaceable to a position radially between the magnetic ring and the magnetic sun and includes electric steel laminations 120. A quantity of electric steel laminations 118 is different than a quantity of electric steel laminations 120.

Modulators 106 and 108 includes respective non-magnetic carrier 122 and 124, and electric steel laminations 118 and 120 are circumferentially distributed in non-magnetic carriers 122 and 124, respectively. The steel laminations may be installed in the carriers by bolting, deformation, or with an adhesive, for example. By non-magnetic, we mean that the carriers are not able to be attracted by a magnet. Carriers 122 and 124 may be formed from a material devoid of iron, nickel or cobalt such as aluminum, stainless steel, or a polymer, for example. Carriers 122 and 124 may be integrally formed from a same piece of material such that modulators 106 and 108 are axially displaced together. In other words, axial displacement of modulator 106 also displaces modulator 108, and vice versa. Gearbox 100 also includes shifting shaft 126 for axially displacing the respective non-magnetic carriers. Modulators 106 and 108 are rotationally fixed such that they rotate at a same speed, as described in more detail below.

Magnets 110 are arranged in a first Halbach array and magnets 114 are arranged in a second Halbach array. A Halbach array incorporates a spatially rotating pattern of magnetization to augment a magnetic field on one side of the array while cancelling the magnetic field to near zero on the other side. In other words, magnets 110 are arranged in groups rotated relative to each other in succession to form pole pairs 112 and magnets 114 are arranged in groups rotated relative to each other in succession to form pole pairs 116. As shown in FIG. 2, for example, north poles 128 of magnets 110 are rotated ninety degrees (90°) clockwise relative to a preceding magnet when ordered in a clockwise direction, and north poles 130 of magnets 114 are rotated ninety degrees (90°) clockwise relative to a preceding magnet when ordered in a counter-clockwise direction. This concentrates a magnetic field of the magnetic sun radially outward and a magnetic field of the magnetic ring radially inward. Modulators 106 and 108 direct magnetic fields from the magnetic sun to the magnetic ring so that they may properly couple with one another.

Each four magnets with north poles facing radially outward, circumferentially clockwise, radially inward, and circumferentially counter-clockwise, respectively, make up an individual pole pair. Otherwise stated, magnets 110 are arranged in groups of exactly four magnets rotated ninety degrees to each other in succession to form individual pole pairs 112, and magnets 114 are arranged in groups of exactly four magnets rotated ninety degrees to each other in succession to form individual pole pairs 116. Although groups of four magnets are shown, other examples are possible. For example, a group of six magnets having north poles rotated sixty degrees (60°) relative to one another or twelve magnets with north poles rotated thirty degrees (30°) relative to one another may form pole pairs in other embodiments (not shown).

Magnets 110 form a quantity of pole pairs 112 and magnets 114 form a quantity of pole pairs 116. A quantity of electric steel laminations 118 is equal to a sum of the quantity of pole pairs 112 and the quantity of pole pairs 116, and a quantity of electric steel laminations 120 is equal to a difference between the quantity of pole pairs 112 and the quantity of pole pairs 116. As shown in the figures, for example, magnetic gearbox 100 has exactly six pole pairs 112 and exactly two pole pairs 116. Therefore, the quantity of electric steel laminations 118 is eight (6+2=8) and the quantity of electric steel laminations 120 is four (6−2=4).

When the magnetic ring is held stationary and the non-magnetic carrier is rotated, an output speed of the magnetic sun is calculated by dividing the number of electric steel laminations by the number of pole pairs in the magnetic sun. In this example, the output ratio is 4:1 (8/2=4) when modulator 106 is aligned with (i.e., in plane with) the magnetic ring and the magnetic sun, and 2:1 (4/2=2) when the gearbox is shifted such that modulator 108 is aligned with the magnetic ring and the magnetic sun. In other words, an output rotation speed if the magnetic sun is greater than an input rotation speed of the non-magnetic carrier. If the device were operated in an opposite direction (rotation of magnetic sun and output of non-magnetic carrier), the ratios would be 1:4 and 1:2, respectively, and an output speed of the non-magnetic carrier would be less than an input speed of the magnetic sun.

If, however, the non-magnetic carriers are held stationary and the magnetic ring is rotated, an output ratio of the magnetic sun is the number of pole pairs in the magnetic ring divided by the number of pole pairs in the magnetic sun. Here, that ratio would be 3:1 (6/2=3), if the magnetic ring is the input and the magnetic sun is the output, or 1:3 if the magnetic sun is the input and the magnetic ring is the output. It should be noted that the modulator does not affect the ratio, but the number of electric steel laminations must still be equal to a sum or difference in the ring and sun pole pairs as discussed above.

Magnetic gearbox 100 includes shaft 132 rotationally fixed to the magnetic sun (e.g., via key 134) and shaft 136 rotationally fixed to modulators 106 and 108. Gearbox 100 also includes bearing 138 for radially positioning the shaft 136 relative to shaft 132. That is, shaft 132 includes a bearing bore and shaft 136 includes a protrusion, and the bearing is installed radially between the bore and the protrusion to provide radial centering without restriction rotation of the shafts relative to one another.

Figure 5:
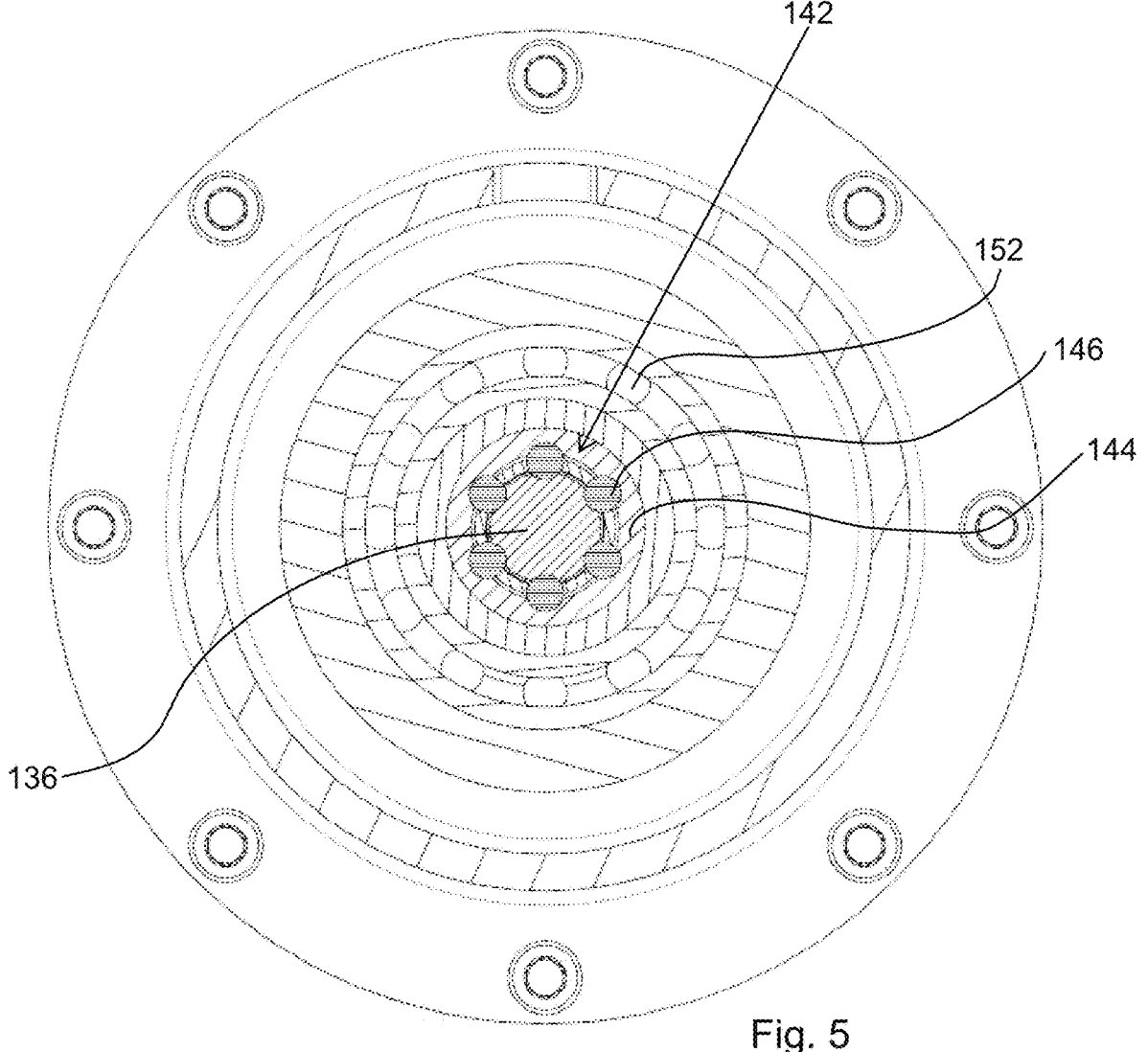
FIG. 5 illustrates a cross-sectional view of the two-speed magnetic gearbox of FIG. 1 taken generally along line 5-5 in FIG. 3.

The following description is made with reference to FIGS. 1-5. FIG. 5 illustrates a cross-sectional view of the two-speed magnetic gearbox of FIG. 1 taken generally along line 5-5 in FIG. 3. Magnetic gearbox 100 also includes carrier 140 and ball spline 142. Electric steel laminations 118 and 120 are circumferentially distributed and axially offset in the carrier, and the carrier is rotationally fixed and axially displaceable relative to shaft 136 through the ball spline. Ball spline 142 includes ball spline sleeve 144 rotationally fixed to the carrier and balls 146 arranged radially between the ball spline sleeve and shaft 136. That is, the sleeve and the shaft have respective axial grooves arranged for receiving the balls. The ball spline allows for torque transmission between carrier 140 and shaft 136 and axial displacement of the carrier to align one of modulator 106 or modulator 108 with the magnetic ring and the magnetic sun to adjust an output ratio of the magnetic gearbox. Gearbox 100 also includes non-rotatable housing 148 and the magnetic ring is rotationally fixed to the non-rotatable housing. Bearings 150 and 152 rotationally isolate non-rotating shifting shaft 126 from rotating carrier 140.

Two-speed magnetic gearbox 100 includes rotationally fixed magnetic ring 102 with magnets 110 arranged to form pole pairs 112, rotatable magnetic sun 104 with magnets 114 arranged to form pole pairs 116, rotatable modulator 106 with steel laminations 118 and rotatable modulator 108 with steel laminations 120. A quantity of steel laminations 118 is equal to a sum of a quantity of pole pairs 112 and a quantity of pole pairs 116 and a quantity of steel laminations 120 is equal to a difference of the quantity of pole pairs 112 and the quantity of pole pairs 116. Each one of pole pairs 112 includes exactly four magnets of magnets 110, and each one pole pairs 116 includes exactly four magnets of magnets 114. Each one of pole pairs 112 is a Halbach array directed radially inward and each one of pole pairs 116 is a Halbach array directed radially outward. In other words, magnets 110 forming each one of pole pairs 112 are arranged in a Halbach array and magnets 114 forming pole pairs 116 are arranged in a Halbach array.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Two-speed magnetic gearbox
102 Magnetic ring
104 Magnetic sun
106 Modulator (first)
108 Modulator (second)
110 Magnets (first plurality, magnetic ring)
112 Pole pairs (first plurality, magnetic ring)
114 Magnets (second plurality, magnetic sun)
116 Pole pairs (second plurality, magnetic sun)
118 Electric steel laminations (first plurality, first modulator)
120 Electric steel laminations (second plurality, second modulator)
122 Non-magnetic carrier (first modulator)
124 Non-magnetic carrier (second modulator)
126 Shifting shaft
128 North poles (magnets 110, magnetic ring)
130 North poles (magnets 114, magnetic sun)
132 Shaft (first)
134 Key
136 Shaft (second)
138 Bearing
140 Carrier
142 Ball spline
144 Ball spline sleeve
146 Balls (ball spline)

148 Non-rotatable housing
150 Bearing
152 Bearing

What is claimed is:

1. A two-speed magnetic gearbox, comprising:
a magnetic ring comprising an inner circumference and a first plurality of magnets distributed about the inner circumference forming a first plurality of pole pairs;
a magnetic sun arranged radially inside of the magnetic ring, the magnetic sun comprising an outer circumference and a second plurality of magnets distributed about the outer circumference forming a second plurality of pole pairs, a quantity of the second plurality of pole pairs being different than a quantity of the first plurality of pole pairs;
a first modulator arranged radially between the magnetic ring and the magnetic sun, the first modulator being axially displaceable and comprising a first plurality of electric steel laminations; and
a second modulator arranged coaxial with and axially offset from the first modulator, the second modulator being axially displaceable to a position radially between the magnetic ring and the magnetic sun and comprising a second plurality of electric steel laminations, wherein a quantity of the first plurality of electric steel laminations is different than a quantity of the second plurality of electric steel laminations, wherein:
the quantity of the first plurality of electric steel laminations is equal to a sum of the quantity of the first plurality of pole pairs and the quantity of the second plurality of pole pairs; and
if the quantity of the first plurality of pole pairs is greater than the quantity of the second plurality of pole pairs, the quantity of the second plurality of electric steel laminations is equal to a difference between the quantity of the first plurality of pole pairs and the quantity of the second plurality of pole pairs; or
if the quantity of the first plurality of pole pairs is less than the quantity of the second plurality of pole pairs, the quantity of the second plurality of electric steel laminations is equal to a difference between the quantity of the second plurality of pole pairs and the quantity of the first plurality of pole pairs.

2. The two-speed magnetic gearbox of claim 1 wherein:
the first modulator and the second modulator each comprise a respective non-magnetic carrier; and
the first plurality of electric steel laminations and the second plurality of electric steel laminations are circumferentially distributed in the respective non-magnetic carrier.

3. The two-speed magnetic gearbox of claim 2 wherein the respective non-magnetic carriers are integrally formed from a same piece of material.

4. The two-speed magnetic gearbox of claim 2 further comprising a shifting shaft for axially displacing the respective non-magnetic carriers.

5. The two-speed magnetic gearbox of claim 1 wherein the first modulator and the second modulator are rotationally fixed such that they rotate at a same speed.

6. The two-speed magnetic gearbox of claim 1, wherein:
the first plurality of magnets are arranged in a first Halbach array; and
the second plurality of magnets are arranged in a second Halbach array.

7. The two-speed magnetic gearbox of claim 1, wherein:
the first plurality of magnets are arranged in groups rotated relative to each other in succession to form individual pole pairs of the first plurality of pole pairs; and
the second plurality of magnets are arranged in groups rotated relative to each other in succession to form individual pole pairs of the second plurality of pole pairs.

8. The two-speed magnetic gearbox of claim 1, wherein:
the first plurality of magnets are arranged in groups of exactly four magnets rotated ninety degrees to each other in succession to form individual pole pairs of the first plurality of pole pairs; and
the second plurality of magnets are arranged in groups of exactly four magnets rotated ninety degrees to each other in succession to form individual pole pairs of the second plurality of pole pairs.

9. The two-speed magnetic gearbox of claim 1 wherein:
the quantity of the first plurality of pole pairs is exactly six pole pairs; and
the quantity of the second plurality of pole pairs is exactly two pole pairs.

10. The two-speed magnetic gearbox of claim 1 further comprising:
a first shaft rotationally fixed to the magnetic sun; and
a second shaft rotationally fixed to the first modulator and the second modulator.

11. The two-speed magnetic gearbox of claim 10 further comprising a bearing for radially positioning the second shaft relative to the first shaft.

12. The two-speed magnetic gearbox of claim 10 further comprising:
a carrier; and
a ball spline, wherein:
the first plurality of electric steel laminations and the second plurality of electric steel laminations are circumferentially distributed and axially offset in the carrier; and
the carrier is rotationally fixed and axially displaceable relative to the second shaft through the ball spline.

13. The two-speed magnetic gearbox of claim 12 wherein the ball spline comprises:
a ball spline sleeve rotationally fixed to the carrier; and
a plurality of balls arranged radially between the ball spline sleeve and the second shaft.

14. The two-speed magnetic gearbox of claim 1 further comprising a non-rotatable housing, wherein the magnetic ring is rotationally fixed to the non-rotatable housing.

15. A two-speed magnetic gearbox, comprising:
a magnetic ring comprising an inner circumference and a first plurality of magnets distributed about the inner circumference forming a first plurality of pole pairs;
a magnetic sun arranged radially inside of the magnetic ring, the magnetic sun comprising an outer circumference and a second plurality of magnets distributed about the outer circumference forming a second plurality of pole pairs, a quantity of the second plurality of pole pairs being different than a quantity of the first plurality of pole pairs;
a first modulator arranged radially between the magnetic ring and the magnetic sun, the first modulator being axially displaceable and comprising a first plurality of electric steel laminations;
a second modulator arranged coaxial with and axially offset from the first modulator, the second modulator being axially displaceable to a position radially between the magnetic ring and the magnetic sun and comprising a second plurality of electric steel laminations, wherein a quantity of the first plurality of electric steel laminations is different than a quantity of the second plurality of electric steel laminations;

a first shaft rotationally fixed to the magnetic sun;

a second shaft rotationally fixed to the first modulator and the second modulator a carrier; and a ball spline, wherein:

the first plurality of electric steel laminations and the second plurality of electric steel laminations are circumferentially distributed and axially offset in the carrier; and the carrier is rotationally fixed and axially displaceable relative to the second shaft through the ball spline.

16. The two-speed magnetic gearbox of claim 15 further comprising a bearing for radially positioning the second shaft relative to the first shaft.

17. The two-speed magnetic gearbox of claim 15 wherein the ball spline comprises:

a ball spline sleeve rotationally fixed to the carrier; and a plurality of balls arranged radially between the ball spline sleeve and the second shaft.

18. The two-speed magnetic gearbox of claim 15 further comprising a non-rotatable housing, wherein the magnetic ring is rotationally fixed to the non-rotatable housing.

\* \* \* \* \*